United States Patent [19]
Doheny

[11] 3,785,669
[45] Jan. 15, 1974

[54] CONVERTIBLE BULK HAND TRUCK

[75] Inventor: William Michael Doheny, Atlanta, Ga.

[73] Assignee: The Coca-Cola Company, Atlanta, Ga.

[22] Filed: Aug. 28, 1972

[21] Appl. No.: 284,329

[52] U.S. Cl............................ 280/47.18, 280/47.27
[51] Int. Cl............................................... B62b 3/04
[58] Field of Search...................... 280/47.18, 47.2, 280/47.27

[56] References Cited
FOREIGN PATENTS OR APPLICATIONS

| 686,148 | 1/1967 | Belgium | 280/47.18 |
| 956,468 | 8/1949 | France | 280/47.2 |
| 1,500,291 | 9/1967 | France | 280/47.18 |

*Primary Examiner*—David Schonberg
*Assistant Examiner*—John A. Pekar
*Attorney*—William Dexter Brooks

[57] ABSTRACT

A convertible bulk hand truck is described which is capable of being adjustably positioned by virtue of a unique foldable adjustable linkage between folded and unfolded positions to define either a two wheeled dolly device or a four wheeled platform cart. The hand truck is lightweight, yet strong and rigid for dependable performance in hard, everyday service, has excellent load stability and is capable of transporting stacked products around manufacturing and sales points with maximum ease.

10 Claims, 9 Drawing Figures

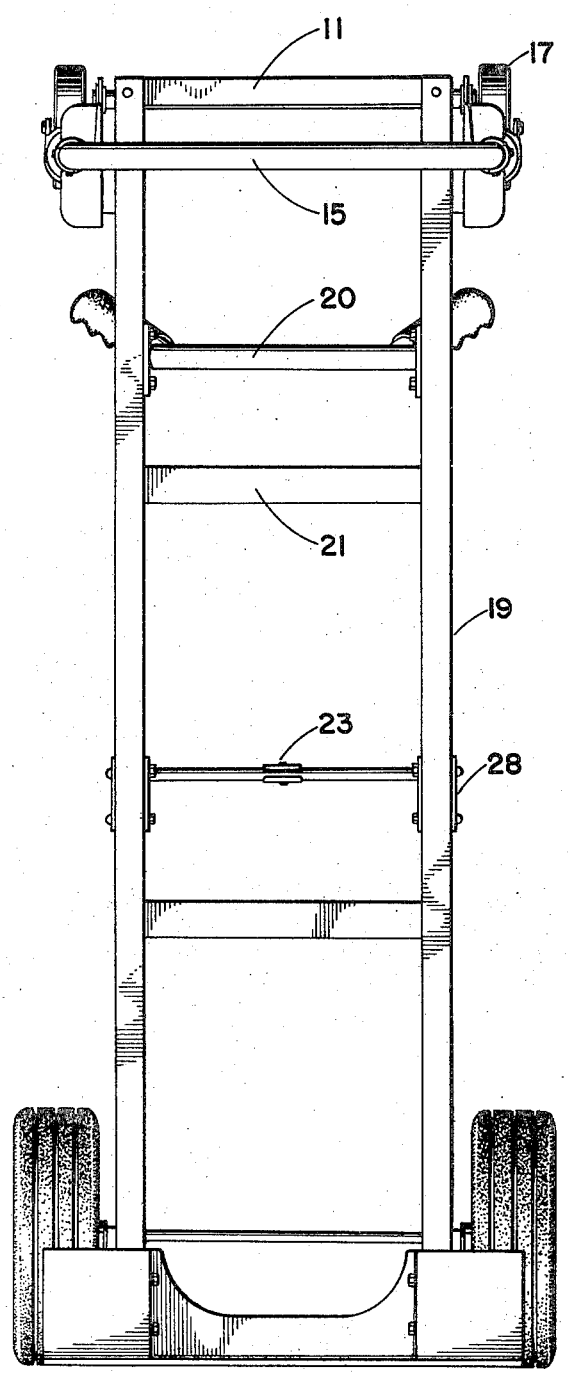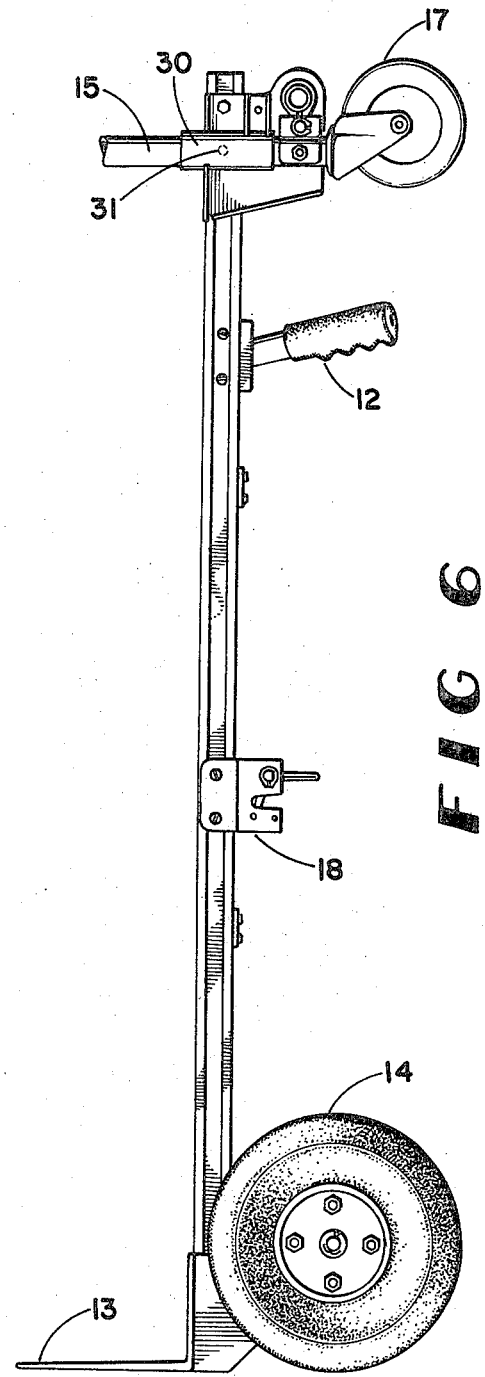

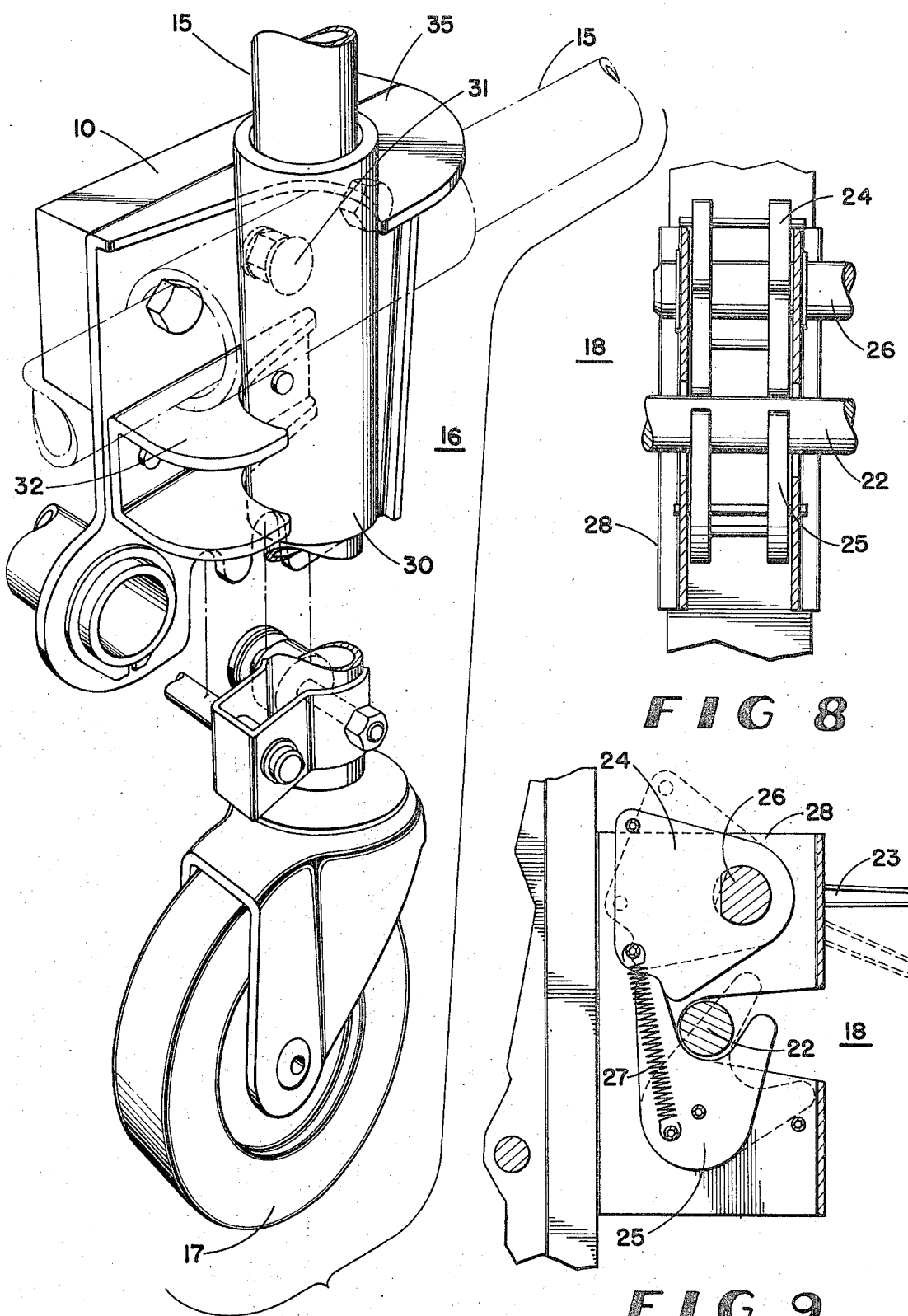

CONVERTIBLE BULK HAND TRUCK

BACKGROUND OF INVENTION

The present invention relates to a convertible bulk hand truck capable of being adjustably positioned between folded and unfolded positions to define either a two wheeled dolly device or a four wheeled platform cart.

The transportation of cases of bottled beverages, such as milk, soft drinks, beer and wine and the like by a bottler from a bottling plant to a route distribution point has always been a time consuming and expensive operation. It has heretofore been practiced where these cases were to be delivered, that two basic types of manually operated wheeled transporting devices be employed for handling the cases.

The first and most common type of wheeled device consists of an elongate, normally upwardly and rearwardly projecting material supporting frames with handles at its upper end, a forwardly projecting material engaging and supporting toe plate at its lower end and a pair of laterally spaced support wheels mounted at the lower end of the frame to occur rearwardly thereof. This type of device has become commonly known as a "dolly device."

Dolly devices, such as described above are made in many different and special designs for special uses. For example, specially designed dolly devices with short toe plates, are provided for handling goods in small packages or containers. Such specially designed dolly devices are not suitable for handling large cartons or sacked goods, such as coal or potatoes. Accordingly, specially designed dolly devices with larger or longer toe plates are provided for handling these large cartons and sacked goods.

In addition to the above example, specially designed dolly devices are provided for handling barrels or drums, soft drink cases, appliances and many other goods and materials which present special handling problems.

As a result of the above, a great number of shops, warehouses, stores and common carriers, must purchase, maintain and use a wide variety of dolly devices. The necessity and/or desirability of having several available types or styles of dolly devices is expensive, complicated and troublesome.

The other or second type of wheeled device that the art has developed and which finds wide use throughout industry includes an elongate horizontally disposed frame with an upwardly projecting handle at one end, a pair of support wheels, on fixed axles, at one end of the frame and a pair of caster type wheels at the other end of the frame. This four wheeled type of truck is commonly referred to as a "flat bed platform truck" and is widely used to carry or transport goods which are too bulky or of such size and shape that they cannot be advantageously transported on a two wheeled "dolly device."

The latter, second type of truck is widely used in shops, warehouses and stores but is infrequently used by truckers or common carriers, in spite of the frequent need for such a truck. This is primarily due to the fact that such trucks are awkward and difficult to handle, as for instance, they are difficult to load and unload from trucks and similar vehicles. Furthermore, such trucks occupy considerable space and there is a practical limit as to the number of special pieces of work handling equipment a trucker or common carrier can be equipped with.

Under practical circumstances, both types of manually operated wheeled transporting devices are generally employed. This results in a considerable expense because of increased time requirements for delivery routes and/or increased equipment expenditures.

These increased expenditures have become disastrous in recent years, since there has been a growing trend in the industry to shift compensation for the delivery salesman function from a base plus commission to an hourly basis. One result of this has been the equation of time and money in terms of route delivery. Thus, by decreasing the time requirement of route delivery, substantial monetary savings can be achieved. With the advent of preselling delivery, delivery routes now deliver more cases and consequently pick up more empty containers. Since this handling requirement is exponentially proportional to the number of cases delivered, new delivery devices are needed to reduce delivery efficiencies, thereby resulting in additional expenditures of capital and labor.

Accordingly, there has arisen a need in the industry for the production of a convertible bulk hand truck, preferably of simple construction, that is capable of being adjustably positioned between folded and unfolded position to define either a two wheeled dolly device or a four wheeled platform cart. The bulk hand truck should be capable of being adjustably positioned quickly at all times between the folded and unfolded positions and accomodate packages of different types and sizes in a stacked arrangement at manufacturing and sales points.

OBJECTS OF INVENTION

An object of the present invention is to provide a manually operated, wheeled material handling truck which is convertible from a two wheeled "dolly device" to a four wheeled "platform truck."

Another object of the present invention is to provide a convertible hand truck of the character referred to herein having an elongate frame with a toe plate and a pair of primary support wheels at one end and a secondary handle having casters at the other end whereby said construction is serviceable as a two wheeled dolly device in its upright position.

Another object of the present invention is to provide a convertible hand truck of the character referred to herein wherein a pair of secondary, caster type, support wheels are provided at the end portion of the frame remote from the primary support wheels, which secondary support wheels cooperate with the primary wheels and serve to support the frame in a horizontal position when it is employed as a two wheeled dolly device and is in a down or horizontal position and which serve as supporting and turning wheels when the device is used as a platform cart.

Still another object of the present invention is to provide a novel gravity operated pivot linkage between the secondary handle and frame to enable a user to convert the hand truck from a standard upright two wheeled application to four wheeled platform application in seconds.

Another object of the present invention is to provide a hand truck of the character referred to herein having a novel spring activated locking mechanism for securing a secondary handle locking bar to the rear of the hand truck bed during the upright application and having a foot releasable lever associated with the locking mechanism so that upon being depressed, the secondary handle locking bar is pushed free from the rear of the hand truck readying the hand truck for conversion to the platform application.

A further object of the present invention is to provide a hand truck of the character referred to wherein the secondary caster support wheels are provided at the end of the secondary handle so as not to interfere or otherwise obstruct the user while the truck is in the upright position.

A further object of the present invention is to provide a utility hand truck of the character referred to having a novel, rigid, durable and compact frame construction; a truck which is easy and economical to manufacture and a truck which is highly effective, dependable and easy to operate.

These, other, and further objects, important features, and advantages of the present invention to which attention has not been specifically directed hereinabove, will be better understood and appreciated by those skilled in the art from the following detailed description of the invention taken in conjunction with the accompanying drawings.

BRIEF DESCRIPTION OF DRAWING

The present invention will now be described, by way of example, with reference to the accompanying drawings, in which:

FIG. 5 is a top view of the four wheeled platform cart shown in FIG. 2;

FIG. 6 is a side elevational view of the four wheeled platform cart shown in FIG. 2;

FIG. 7 is a sectional view of the gravity operated pivot linkage taken along line 5—5 on FIG. 2;

FIG. 8 is an enlarged elevational partial view of the spring operated locking mechanism shown in FIG. 3; and FIG. 9 is a side elevational view of the spring operating locking mechanism shown in FIG. 3.

DETAILED DESCRIPTION OF INVENTION

Figure 1:
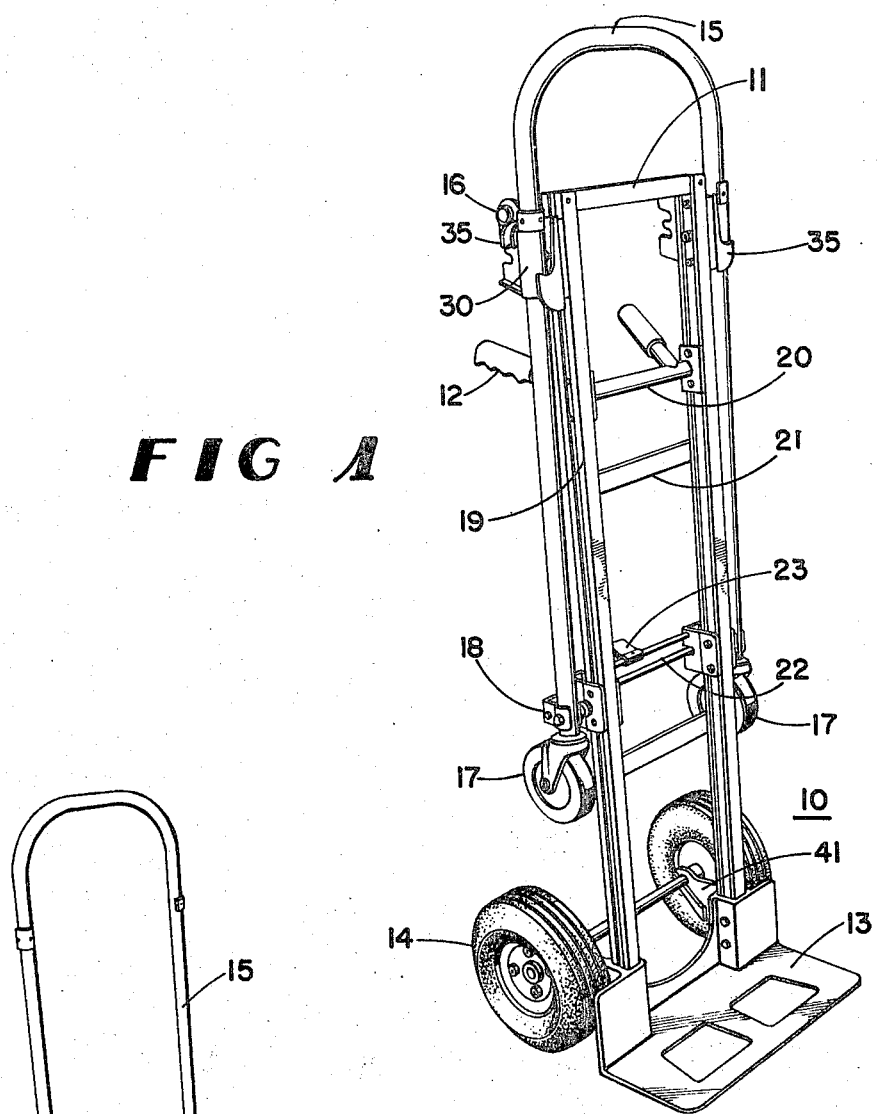
FIG. 1 is an isometric view of the convertible hand truck in the upright position for use as a two wheeled dolly device.

The bulk hand truck provided by this invention and illustrated in the accompanying drawings includes generally an elongated frame 10 which defines a truck bed 11, handle grips 12 at one end of the frame 10, a toe plate or lip 13 at the other end of the frame 10, a pair of primary support wheels 14 at said other end of the frame 10, a secondary handle 15 associated with the frame 10 at said one end by virtue of a pair of gravity operated pivot linkages 16, a pair of secondary support casters 17 carried by said secondary handle 15, and a pair of spring activated locking mechanisms 18 associated with said secondary handle 15 to lock a secondary locking bar 22 to the frame 10 and position the casters 17 flush with the frame 10 when the hand truck is used in an upright dolly position.

The frame 10 is an elongate structure fabricated of steel, magnesium or similar material tubing, plate and angle stock. The various related parts going to make up the frame are secured or fixed together by welding or any other well-known securing means to establish a unitary, integrated frame structure.

In the form of the invention illustrated, the frame 10 is provided with a pair of laterally spaced, elongate, parallel side members or rails 19, coextensive with the longitudinal extent of the frame 10, a handle support bar 20 fixed to and extending between the rails 19 and transverse to the longitudinal axis of the frame 10, a pair of laterally spaced axle brackets 41 fixed to the other end of the rail, and load support members 21 fixed to and extending between the rails 19.

Figure 2:
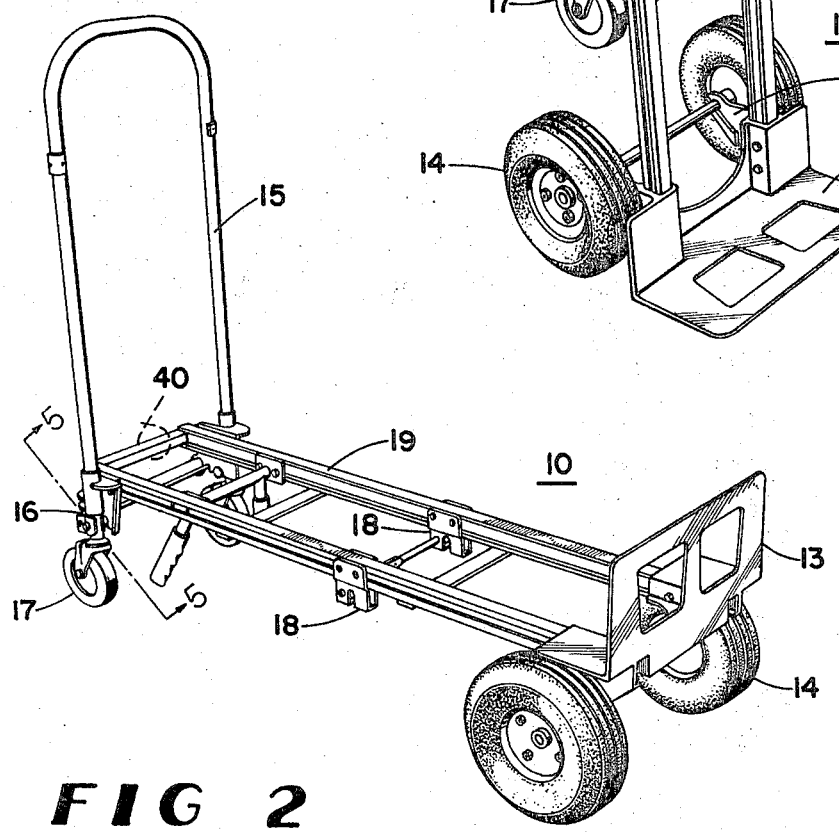
FIG. 2 is a perspective view of the convertible hand truck in the platform position for use as a four wheeled platform cart.
Figure 3:
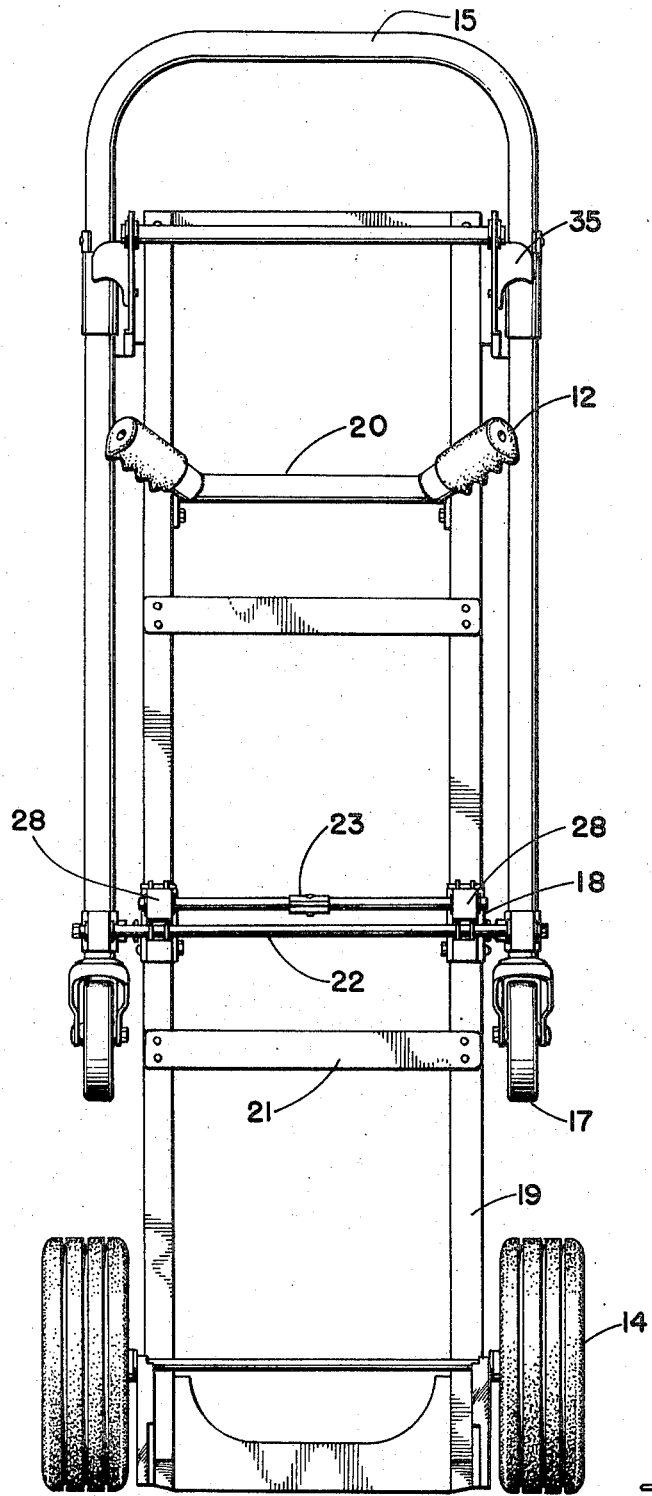
FIG. 3 is a back elevational view of the two wheeled dolly device shown in FIG. 1.
Figure 4:
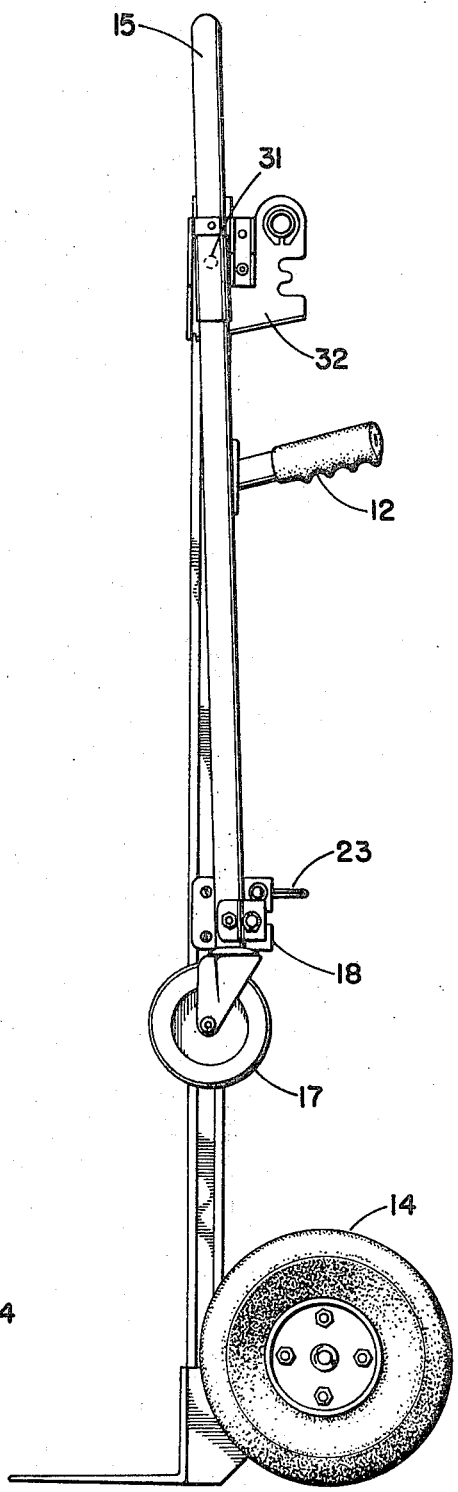
FIG. 4 is a side elevational view of the two wheeled dolly device shown in FIG. 1.

That portion of the frame 10 set forth above, that is, the primary portion of the frame, defines an elongate, flat, rectangular frame work having ends, sides and oppositely disposed planes or surfaces. As illustrated in FIGS. 1, 3 and 4, when the portion of the frame now under consideration is vertically disposed and used as a two wheeled dolly device, it has upper and lower ends, parallel sides and front and rear planes or surfaces. As illustrated in FIGS. 2, 5 and 6, when it is horizontally disposed and used as a four wheeled platform cart, the front and rear planes as surfaces become upper and lower planes or surfaces and the upper and lower ends become front and rear ends.

Referring to the drawing and more particularly FIGS. 1, 3 and 4, a bulk hand truck will be seen incorporating the present invention. The truck is diagrammatically illustrated in its standard upright two wheeled application. As depicted in FIG. 1, the truck or dolly device includes a pair of spring activated locking mechanisms 18 for securing a secondary handle locking bar 22 to the rear of the hand truck bed 11 during the upright application and having a foot releasable lever 23 associated therewith so that upon being depressed by the user, the secondary handle locking bar 22 is pushed free from the lock and rear of the hand truck, readying the hand truck for conversion to the platform application of FIG. 2. The locking mechanisms 18 allow the secondary caster support wheels 17 to be locked flush with the frame 10 when used in an upright position and in a location which does not interfere or otherwise obstruct the user or product while the truck is used in the upright position.

As shown in FIGS. 8-9, each of the locking mechanisms 18 comprise a pair of upper 24 and lower 25 irregular shaped lock members that are mounted within flange means 27 which are in turn bolted or otherwise secured to opposite sides of frame 10. During an upright application of the truck, the secondary handle locking bar 22 is secured within the upper 24 and lower 25 lock members. Due to their irregular shapes, the upper section 24 of each lock is positioned in an abutting relationship to lower section 25 of the locking mechanisms 18 so that upon release of the foot lever 23, the upper section 24 of each lock is rotated as shown in FIG. 9 about axle 26. This rotation of upper sections 24 release lower sections 25 with the aid of tension springs 27 which raise the rear area of lower sections 25 and push the locking bar 22 free from the lock and rear of the dolly device, readying the device for conversion to the platform position.

In FIG. 7, a section is shown of one gravity operated pivot linkage 16 that is provided between the secondary handle 15 and frame 10 to enable a user to convert the hand truck from a standard upright two wheeled application to a four wheeled platform application in seconds. Each of the pivot linkages 16 comprise a sleeve 30 that is connected to the frame 10 of the truck by virtue of a pivot pin 31. The pivot pin 31 may be bolted or secured between the handle 15 and truck bed 11 by any well-known means. A lock plate 32 is secured on opposite sides of the frame 10 at said one end of the frame to lock the truck in the platform position. As the truck bed 11 slides down the secondary handle 15 into a final horizontal position (See FIG. 2), the lock plates 32 secure the handle 15 at the base portions (including locking bar 22) and prevent further rotation or movement of the same. While in an upright position, a pair of locking flanges 35 function in conjunction with the locking mechanisms 18 to lock the secondary handle and casters and prevent further rotation thereof about pivot pins 31.

FIGS. 2, 5 and 6 illustrate the truck in a platform application. If it is desired to convert the truck from an upright position (FIG. 1) to a platform position (FIG. 2), it is only necessary to use the following steps:

a. The spring-locked release bar 22 is tripped by the user's foot freeing the castered wheel end 17 of the secondary handle 15; and b. With his free hand, user grasps the secondary handle 15, allowing platform bed 11 and sleeve 30 to descend along the secondary handle 15 and lock into the bottom of platform lock plates 32. Little external force is required to be exerted by the user since once the bar 22 is released, the truck center of gravity is changed so that the truck automatically falls into the platform embodiment of FIG. 2.

In order to convert back to a two wheeled operation, the user merely has to hold the platform cart at a location point 40 (FIG. 2) and reverse the above procedure. The above conversion procedures are unique in that they may be conducted with relative ease and without tools due to the truck containing no loose parts.

From the foregoing, it will be apparent that I have provided a novel, highly versatile, effective and dependable utility truck construction which is serviceable for moving and handling many different types and/or kinds of materials and goods.

It is believed that the present invention, its mode of construction, assembly and operation, and many of its advantages attendant thereto should be readily understood from the foregoing without further description and it should also be manifest that, while a preferred embodiment of the invention has been shown and described for illustrative purposes, the structural details are nevertheless capable of wide variation within the purview of the invention as defined in the appended claims.

The embodiment of the invention in which an exclusive property right or privilege is claimed are defined as follows:

1. A bulk hand truck capable of being adjustably positioned between folded and unfolded positions to define either a two wheeled dolly device or a four wheeled platform cart comprising an elongated frame with laterally spaced longitudinally extending side rails and longitudinally spaced laterally extending load supporting members, said frame defining head and base ends and upper and lower planes, a pair of laterally spaced axle brackets fixed to and depending from the side rails at the base end portion of the frame, an axle fixed to and extending between the brackets and rotatably supporting a pair of primary support wheels, an elongate toe plate fixed to the base end of the rails and the brackets to extend transverse of the base end of the frame and to project upwardly therefrom, an elongated U-shaped secondary handle having a pair of elongate parallel leg portions connected together by virtue of a curved head portion and including a secondary support caster on the free end of each leg portion, means for slidably, as well as pivotally mounting the secondary handle to the head end of said frame and allowing said secondary handle to be shifted from a vertical, folded position parallel to the said rails to a horizontal, unfolded position transverse to the side rails.

2. A bulk hand truck as defined in claim 1 wherein locking means are provided on the frame to releasably hold the secondary handle in its vertical, folded position and parallel to the side rails of the truck.

3. A bulk hand truck as defined in claim 2 wherein the locking means comprise a pair of spring activated upper and lower lock members that are positioned in abutting relationship to each other, connected together by a tension spring and mounted to the frame whereby the secondary handle may be secured by said lock members to the frame.

4. A bulk hand truck as defined in claim 1, wherein said means pivotally connecting the ends of the secondary handle to the frame includes a sleeve member on said leg portions of the secondary handle, said sleeve member being attached to the frame by laterally inwardly projecting pivot pins and said leg portions being slidable within said sleeve members so as to shift the secondary handle from a folded vertical position to an unfolded, horizontal position.

5. A bulk hand truck as defined in claim 4, wherein locking means are provided on the frame to releasably hold the secondary handle in its vertical, folded position and parallel to the side rails of the truck.

6. A bulk hand truck as defined in claim 5 wherein the locking means comprise a pair of spring activated upper and lower lock members that are positioned adjacent to each other, connected together by a tension spring and mounted to the frame whereby the secondary handle may be secured by said lock members to the frame.

7. A bulk hand truck as defined in claim 1, wherein a secondary handle locking bar is fixed to and depending from the free ends of the leg portions, locking means being provided on the frame to releasably hold the secondary handle locking bar when the handle is positioned in its vertical, folded position and parallel to the side rails of the truck and a manual releasable lever means being associated with the locking means so that upon being depressed by a truck user, the secondary handle locking bar is pushed free from the locking means, readying the truck for conversion to the platform application.

8. A bulk hand truck as defined in claim 7, wherein said means pivotally connecting the ends of the secondary handle to the frame includes a sleeve member on said leg portions of the secondary handle, said sleeve member being attached to the frame by laterally inwardly projecting pivot pins and said leg portions being slidable within said sleeve members so as to shift the secondary handle from a folded vertical position to an unfolded, horizontal position.

9. A bulk hand truck capable of being adjustably positioned between folded and unfolded positions to define either a two wheeled dolly device or a four wheeled platform cart comprising an elongated frame with laterally spaced longitudinally extending side rails and longitudinally spaced laterally extending load supporting members, said frame defining head and base ends and upper and lower planes, a pair of laterally spaced axle brackets fixed to and depending from the side rails at the base end portion of the frame, an axle fixed to and extending between the brackets and rotatably supporting a pair of primary support wheels, an elongate toe plate fixed to the base end of the rails and the brackets to extend transverse of the base end of the frame and to project upwardly therefrom, an elongated U-shaped secondary handle having a pair of elongate parallel leg portions connected together by a curved head portion and including a secondary support caster on the free end of each leg portion, means pivotally mounting the leg portions to the head end of said frame and including a sleeve member slidably positioned on each of said leg portions and being attached to the frame by a pair of laterally inwardly projecting pivot pins, a pair of spring activating first locking means being associated with the frame to releasably hold the secondary handle in a vertical, folded position and parallel to the side rails of the truck when used as a two wheeled dolly device, a manually releasable lever means being affixed to said first locking means so that upon being depressed, the secondary handle is pushed free from the first locking means, readying the truck for conversion to the four wheeled platform cart application.

10. A bulk hand truck as defined in claim 9 wherein a second locking means are provided adjacent to the pivoting means at the head end of the frame and a secondary handle locking bar being fixed to and depending from the free ends of the leg portions, said locking bar being positioned on the handle so as to cooperate with said first locking means to secure the secondary handle parallel to the frame when the truck is employed as a two wheeled dolly device and further positioned so as to cooperate with the second locking means to secure the secondary handle transverse to the frame when the truck is employed as a four wheeled platform cart.

* * * * *